(12) United States Patent
Kawaguchi (10) Patent No.: US 7,806,369 B2
(45) Date of Patent: Oct. 5, 2010

(54) ULTRAHIGH ALTITUDE SUN-SYNCHRONOUS ORBIT SATELLITE SYSTEM

(75) Inventor: Junichiro Kawaguchi, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 278 days.

(21) Appl. No.: 11/630,087

(22) PCT Filed: Jun. 22, 2004

(86) PCT No.: PCT/JP2004/008742

§ 371 (c)(1),
(2), (4) Date: Dec. 20, 2006

(87) PCT Pub. No.: WO2005/123507

PCT Pub. Date: Dec. 29, 2005

(65) Prior Publication Data

US 2008/0029650 A1 Feb. 7, 2008

(51) Int. Cl.
*B64G 1/10* (2006.01)
*B64G 1/00* (2006.01)
(52) U.S. Cl. .................. 244/158.4; 244/158.1
(58) Field of Classification Search .............. 244/158.4, 244/158.6, 158.1
See application file for complete search history.

(56) References Cited

U.S. PATENT DOCUMENTS 5,183,225 A * 2/1993 Forward .................. 244/158.6
6,457,678 B1 * 10/2002 Draim ..................... 244/158.4

FOREIGN PATENT DOCUMENTS

| JP | 10-258799 A | 9/1998 |
|---|---|---|
| JP | 2002-37200 A | 2/2002 |
| JP | 2002-257917 A | 9/2002 |
| JP | 2004-088563 A | 3/2004 |

OTHER PUBLICATIONS

Bennet, C. L., et al. The Microwave Anisotropy Probe (MAP) Mission, The Astrophysical Journal, available online since Mar. 14, 2003. Accessed online on Dec. 19, 2008 at http://web.archive.org/web/20030917030310/lambda.gsfc.nasa.gov/product/map/pub_papers/prerelease/mission_paper/map_mission_paper.pdf.*

(Continued)

*Primary Examiner*—Tien Dinh
*Assistant Examiner*—Richard R Green
(74) *Attorney, Agent, or Firm*—Westerman, Hattori, Daniels & Adrian, LLP (57) ABSTRACT

An ultrahigh altitude sun-synchronous orbit satellite system having one or plural satellites orbiting the sun such that the satellites revolve around the earth in a substantially circular or elliptic motion at an altitude of several million kilometers from the earth, beyond the sphere of earth gravity influence. The satellites are placed on an orbital plane relative to both the sun and the earth and keep a distance and geometry between the satellites, sun and earth substantially constant. The satellite system performs any one of the services of space observation, global observation, and satellite communication. The satellites orbit the sun with both inclination and eccentricity distinct from those of the revolution of the earth and revolve around the earth with a sun synchronous property in which the local solar time is kept constant at a point on the surface of the earth directly beneath the satellite.

9 Claims, 4 Drawing Sheets

OTHER PUBLICATIONS

Gurflil and Kasdin, "Practical Deep-Space Geocentric and Out-of-Ecliptic Orbits in the Sun-Earth Restricted Three-Body Problem" 2003, Proceedings of SPIE vol. 4854, pp. 251-261.*

Gurfil and Kasdin, "Niching genetic algorithms-based characterization of geocentric orbits in the 3D elliptic restricted three-body problem" Comput. Methods Appl. Mech. Engrg. 191 (2002) pp. 5683-5706, 2002 Elsevier Science B.V.*

Translation of International Preliminary Report on Patentability mailed Mar. 1, 2007 of International Application No. PCT/JP2004/008742.

International Search Report of PCT/JP2004/008742, date of mailing Aug. 17, 2004.

* cited by examiner

ULTRAHIGH ALTITUDE SUN-SYNCHRONOUS ORBIT SATELLITE SYSTEM

TECHNICAL FIELD

The present invention relates to an ultrahigh altitude sun-synchronous orbit satellite system, in which satellites fly in an interplanetary space revolving around the sun but apparently revolve around the earth. More specifically, the present invention relates to an ultrahigh altitude sun-synchronous orbit satellite system for realizing a high accuracy and high quality scientific satellite system observing celestial bodies or the earth, as well as a communication satellite system covering the earth hemisphere simultaneously, the scientific satellite and communication satellite systems realizing a ultrahigh altitude sun-synchronous condition by expanding a low altitude of a sun-synchronous orbit relying on the gravity harmonics effects, which is a conventional concept of sun-synchronous orbits utilized presently.

BACKGROUND ART

In astronomical satellites and the like, there has been conventionally employed a so-called sun-synchronous orbit in view of that the directions and relative positions of the sun and the earth viewed from the satellite can be kept constant. However, in the sun-synchronous orbits according to the conventional concept, since non-spherical components of the gravity, which are attributable to the oblateness of the earth, are used, conventional sun-synchronous orbits are realized only in a low-altitude orbit of approximately several hundred kilometers to a thousand kilometers, on which the satellites revolve around the earth (see the patent document 1), and the thermal radiation input from the earth cannot be avoided inevitably, thus this thermal radiation input from the earth is extremely disadvantageous to a cryogenically cooled telescope and the like in astronomical satellites. Moreover, when used as a communication satellite system, there is a drawback that the coverage thereof is narrower than that of a high-altitude geostationary satellite system, thus the sun-synchronous orbit based on the conventional concept is not used for a communication purpose. From the perspective of avoiding a thermal radiation input from the earth, it is necessary to extend the distance between the satellite and the earth, but according to the conventional concept of sun-synchronous orbits, the synchronous characteristics thereof apply only to the low-altitude orbit, thus this sun-synchronous condition cannot be satisfied by high-altitude orbits, i.e., long-period orbits.

Therefore, the distance between a satellite and the earth is sufficiently extended to Lagrangian points of the solar-terrestrial system to avoid the thermal radiation from the earth, whereby the geometry between the earth and the sun can be kept constant again. As a mission placing a satellite at the Lagrangian points L2, there is known the NASA's James Webb Space Telescope (JWST) satellite. JWST is inserted into a HALO orbit drifting in the vicinity of L2 point, but a problem in this orbit is in the fact that the geometric conditions in terms of the directions of the sun and the earth are not limited to one direction in principle. Also, there is a problem that the sensitivity to the radio observation information with respect to a position fluctuation of a satellite is small, it is required to accumulate the range measurements on the ground to determine the orbit solution and to secure the navigational accuracy.

From the communication distance point of view, the Lagrangian points which can be used are limited to L1 and L2 points, which are located relatively short distance away from the earth. But since these points are theoretically unstable equilibrium points, these points have to be constantly stabilized actively by performing an orbit determination and an orbit control. Particularly these points are easily affected by the moon's gravity. Further, a trajectory planning, which is more rigorous than that in a normal interplanetary probe, needs to be applied in the initial stage of the insertion, and thus it requires a long period to complete the orbit insertion. Moreover, it is difficult to secure astronomical observation time until the orbit insertion is completed. In the conventional concept, the effect of perturbation caused by non-spherical components of the gravity associated with the earth cannot be expected when the altitude of the sun-synchronous orbit becomes higher, while non-spherical components of the gravity usually generate the sun-synchronous effect, hence it is difficult to satisfy the sun-synchronous condition for the case. As one measure to solve this problem, it is conceived to place a satellite into an interplanetary orbit which flies in the vicinity of the earth. As an actually realized mission example, also as an interplanetary astronomical satellite, NASA's Space Infrared Telescope Facility (SIRTF, currently named Schpitzer) infrared observation satellite is known. In the SIRTF infrared observation satellite, there is selected, as an interplanetary orbit, whose orbital period is slightly altered different from that of the earth. However, in this orbit the distance between the earth and the satellite gradually increases year by year, thus there is a problem that it becomes gradually difficult to receive the data at higher bit rates. Moreover, while the angle between the sun direction and the earth direction, which is viewed from the satellite, the elongation angle of nearly up to 90 degrees is secured and available in the initial stage, such condition progressively becomes unsatisfactory, whereby it becomes gradually difficult to keep the direction of the sun, which is the light source and heat source, when the direction of the earth needs to be right.

Patent Document 1: Japanese Patent Application Laid-Open No. H10-258799

DISCLOSURE OF THE INVENTION

Problem to be Solved by the Invention

Therefore, an object of the present invention is to provide a sun-synchronous orbit satellite system, which is impossible in the conventional sun-synchronous orbit relying on the gravity field's harmonics, which is effective as a scientific satellite system or communication satellite system for astronomical observation or global observation, and which is capable of alleviating the conditions of satellite design by always making the geometric conditions of the sun direction and the earth direction kept constant on an interplanetary orbit, maintaining the distance between the satellite and the earth constant to keep the range within a certain distance bandwidth, meeting the data transfer distance substantially constant, and securing a large coverage on the earth surface without suffering from the thermal radiation input from the earth.

Means for Solving Problem

The ultrahigh altitude sun-synchronous orbit satellites system of the present invention for solving the above problems comprises ultrahigh altitude sun-synchronous orbit satellites (3) which revolve around the sun (5) but apparently revolve around the earth in a substantially circular or elliptic motion at an ultrahigh altitude and in which an orbital plane relative to the earth is substantially frozen, wherein any of services of space observation, global observation, and satellite communication is performed by the satellites system.

The ultrahigh altitude sun-synchronous orbit satellites preferably shall have a rotation period of substantially one year, and desirably shall revolve around the sun while keeping the distance and geometry between the sun and the earth substantially constant at an ultrahigh altitude of at least several millions of km from the earth in order to secure the orbit stability for a long period.

In this ultrahigh altitude sun-synchronous orbit satellite system, the conditions specified are met in which a vector, which is perpendicular to a virtual orbital plane around the earth, maintains substantially a fixed distance regardless of revolution of the earth in a rotating coordinate system having, as one base axis, the sun-to-earth direction centering around the earth, and an observer scans the entire celestial sphere in an inertial system during a single revolution, while avoiding the effects of light and thermal radiation input from the earth, whereby the astronomical/global observation can be carried out.

Moreover, global observation in a polar region is also possible although it is not possible in a conventional geostationary satellite. Furthermore, in the ultrahigh altitude sun-synchronous orbit satellites system, the substantially hemisphere of the earth can be covered at a time simultaneously with one satellite, thus global communication coverage is possible by allotting three of the satellites at equal spaces on a same virtual orbit by using the ultrahigh altitude sun-synchronous orbit satellites as communication satellites.

In the ultrahigh altitude sun-synchronous orbit satellites of the present invention, the ratio relation between an inclination angle i and an eccentricity e of the orbit is not necessarily a special value of 1.73, thus the ultrahigh altitude sun-synchronous orbit satellites can have arbitrary values, and a geometrical positional relation between the sun and the earth can be frozen while continuously keeping the revolution and synchronous condition unchanged constant.

Also, as the orbit of the ultrahigh altitude sun-synchronous orbit satellites of the present invention, it is possible to employ an orbit in which the frozen condition is alleviated and the synchronous condition is approximately established alternatively, that is, an orbit in which the geometrical positional relation can be frozen in an oscillating manner or within a fixed range. This type of obits has a useful advantageous property that the orbit correcyion velocity required at insertion can be reduced.

In addition, in the ultrahigh altitude sun-synchronous orbit satellites system of the present invention, the ultrahigh altitude sun-synchronous orbit satellites can be allotted on an ultrahigh altitude sun-synchronous orbit by utilizing perturbation of the attraction of the earth. With the mechanical and physical characteristics of a normal two-body problem, it is anticipated that an extremely large orbit correction velocity is required and that it takes a long period for the satellites to settle until being inserted into these ultimate ultrahigh altitude sun-synchronous orbits. In a method of launching and inserting the ultrahigh altitude sun-synchronous orbit satellites into the ultrahigh altitude sun-synchronous orbit according to the present invention, unlike the above concept, by taking the advantage of the characteristics associated with the three-body problem where the attraction of the earth is used to amend the orbit by means of perturbation, insertion into an orbit of a wide range of i/e ratio or into an approximately synchronous orbit can be realized by only applying a small orbit correction velocity during a short period of time, thus this method is practically an essential technology.

EFFECT OF THE INVENTION

The ultrahigh altitude sun-synchronous orbit satellite system of the present invention can obtain a sun-synchronous orbit satellite which revolves around the sun and apparently revolves around the earth while keeping a constant direction and geometry of the satellite with respect to the sun and the earth at an ultrahigh altitude of several millions of km excluding the influence of the earth. Also, the ultrahigh altitude sun-synchronous orbit satellites of the present invention have a large number of advantages as a satellite for space observation, global observation, and satellites communication, compared to the conventional orbit satellites, because the ultrahigh altitude sun-synchronous orbit satellites of the present invention can secure a significant distance to the earth which is not affected by the thermal radiation input from the earth and can satisfy the conditions that a vector perpendicular to a virtual orbital plane centering around the earth is substantially fixed regardless of the revolution, without increasing the distance. Especially, by installing an infrared telescope to use the ultrahigh altitude sun-synchronous orbit satellites as astronomical observation satellites or global observation satellites, high accuracy and high quality data such as a high resolution image can be obtained, global observation can be performed in which a visibility condition from the northern hemisphere can be selectively improved, and the hemisphere of the earth including a polar region can be covered simultaneously for quite a long period, thus communication can be performed in which substantially the entire earth is covered simultaneously with approximately three or other small number of satellites.

Moreover, once the ultrahigh altitude sun-synchronous orbit satellites of the present invention are placed as specified, basically no orbit maintenance operation is required, the fuel for orbit adjustment can be reduced significantly, and observation can be performed even from an early stage during while the satellites are located into the orbits.

BRIEF DESCRIPTION OF THE DRAWINGS

[FIG. 3-A] An outer view of an orbital plane of the sun-synchronous orbit of the present invention shown in FIG. 1, the orbital plane centering around the earth viewed from the sun.

[FIG. 3-B] An external view of the orbit viewed from the side.

[FIG. 5-A] An accurate numerical simulation diagram of an ideal ultrahigh altitude sun-synchronous orbit in which an x-z plane is simulated.

[FIG. 5-B] A simulation diagram simulating an x-y plane of the orbit.

[FIG. 5-C] A simulation diagram simulating a y-z plane of the orbit.

[FIG. 6-A] An insertion simulation diagram of an ultrahigh altitude sun-synchronous orbit which is inserted using perturbation of the attraction of the earth, wherein an x-z plane is simulated.

[FIG. 6-B] A simulation diagram simulating an x-y plane of the orbit.

[FIG. 6-C] A simulation diagram simulating a y-z plane of the orbit.

[FIG. 7-A] A simulation diagram of an ultrahigh altitude sun-synchronous orbit inserted using perturbation of the attraction of the earth, the ultrahigh altitude sun-synchronous orbit having a low inclination angle of i=~0 degree, wherein an x-z plane is simulated.

[FIG. 7-B] A simulation diagram simulating an x-y plane of the orbit.

[FIG. 7-C] A simulation diagram simulating a y-z plane of the orbit.

EXPLANATIONS OF LETTERS OR NUMERALS 1 ecliptic plane
2 satellite orbital plane
3 satellite
4 earth
5 sun
6 earth's revolution orbit
7 satellite orbit

BEST MODE FOR CARRYING OUT THE INVENTION

Hereinafter, the best embodiments of the present invention are described with reference to the drawings.

The key point of the present invention is to insert a satellite into an interplanetary orbit in the vicinity of the earth to obtain sun-synchronous conditions in accordance with a geometrical relation.

Figure 1:
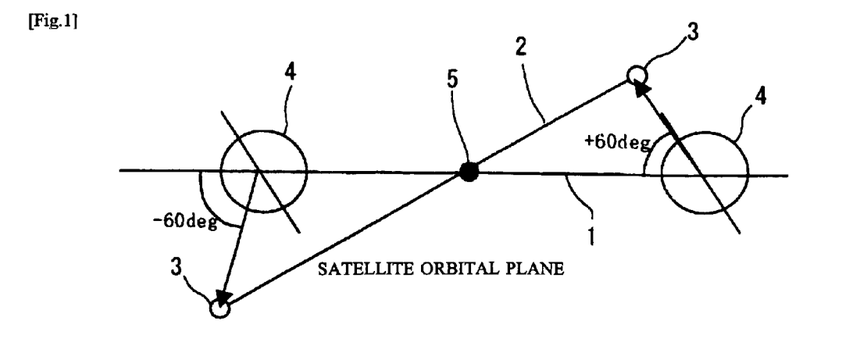
[FIG. 1] An outer view of an orbital plane of a sun-synchronous orbit having a rotation period of one year, according to an embodiment of the present invention.
Figure 2:
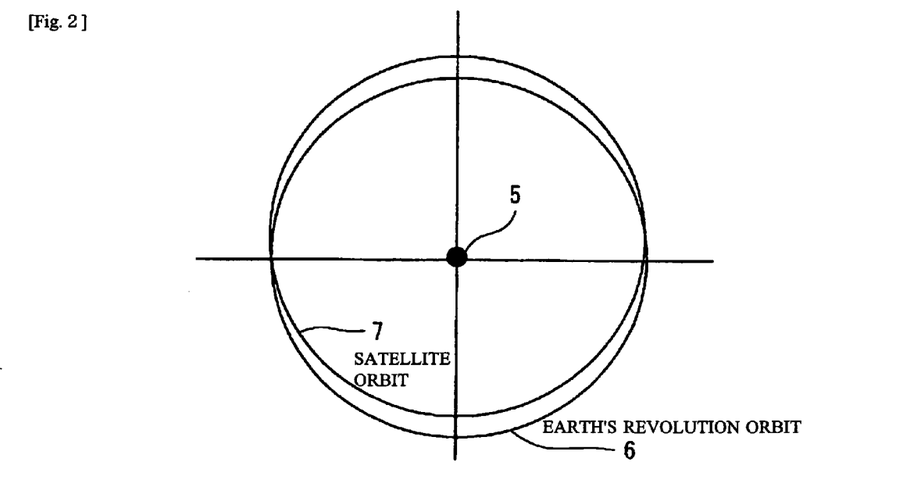
[FIG. 2] A plan view of the orbit.
Figure 3:
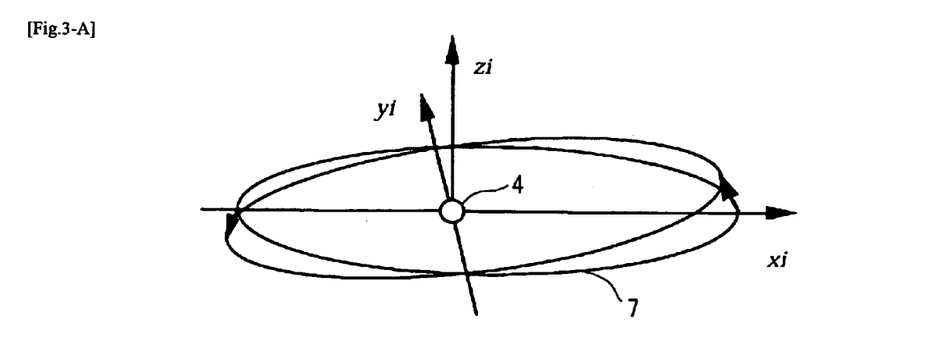
Figure 4:
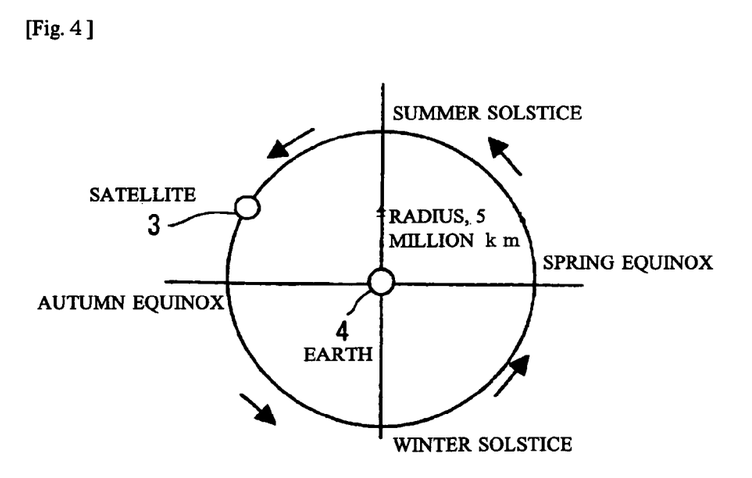
[FIG. 4] An explanatory diagram showing a positional relation between the earth and the sun-synchronous orbit satellite when viewed from the sun, the sun-synchronous orbit satellite having a rotation period of one year according to the embodiment of the present invention.

Specifically, regarding the satellite of the present invention, a satellite 3 is inserted into an interplanetary orbit so that the satellite 3 revolves around the sun 5 at a period of one year such that a satellite orbital plane 2 is inclined to an ecliptic plane 1 in an ecliptic coordinates, as shown in FIG. 1, and ideally the satellite lies on the plane inclined by 60 degrees or −60 degrees relatively to the revolving plane of the earth when viewed from the center of the earth 4. The orbital motion of the satellite which has the same rotation period as the revolution period of the earth, i.e. the same orbit semi-major axis distance, and has a different eccentricity from the earth draws an ellipse having a closed curve within a revolution plane of the earth. On the other hand, the out-of-motion is completely independent of the in-plane-motion, thus when the width of the out-of-motion is selected in an appropriate manner, the satellite apparently revolves around the earth along a constant-radius line. When projected on the earth revolution plane, as shown in FIG. 2, the earth's revolution orbit 6 and a satellite orbit 7 centering around the sun 5 rotate around the sun along substantially similar circular orbits with slightly different eccentricities. When such situation viewed on a virtual orbital plane of the satellite with respect to the earth as a center, the satellite draws a circular orbit surrounding the earth, as shown in FIG. 3 and FIG. 4.

Specifically, it is obtained that the satellite, which is placed on the above-described orbit, has the period adjusted of one year (actually a slight difference occurs because of the influence of the earth's gravity), and the ratio between the eccentricity e and the orbit inclination angle i takes $1:3^{0.5}$, i.e. approximately 1.73. Accordingly, the distance from the earth can be kept unchanged and the positional relation between the sun and the earth can also be left unchanged. Moreover, once the satellite is inserted into the orbit, basically the operation for orbit maintenance is not required since there is little influence of the earth's gravity. Even if the ratio between the eccentricity e and the orbit inclination angle i takes other value, the minimum value of the distance from the earth can be ensured, thus this orbit is a useful orbit which basically satisfies the sun-synchronous conditions while the distance fluctuates.

In the case of conventional sun-synchronous orbits which are realized by using perturbation of the earth gravitational field, the sun-synchronous conditions are realized in the earth fixed coordinates, in which the orbit plane does not include the earth's spin axis, thus the synchronization with the sun is not exact and the local solar time can not be maintained precisely, but the problem was that eclipse occurs and the geometry with the sun fluctuates. With the orbits of the present invention, synchronization with the sun is kept constant because the sun-synchronous conditions obtained are defined in the ecliptic plane, that is, a revolving plane coordinate system of the earth. Although the characteristics related to the equatorial plane system, i.e. the earth-fixed coordinates, suffer from seasonal variations, this fact is advantageous in a certain sense. Particularly when the orbit plan whose declination is 84 degrees or higher in the summer solstice is taken, the all-day visibility from Japan, i.e. the middle to higher latitude area in the northern hemisphere, can be assured during three months around the summer solstice, and, in the winter solstice as well, an eight-hour operation per day can be secured when the declination is taken higher than −36 degrees. During the spring and autumn solstice, fourteen-hour operation per day can be secured. Such conditions can be established true for the opposite hemisphere, i.e. the southern hemisphere.

The distance from the satellite to the earth should be able to satisfy such conditions theoretically if the influence of the earth is specified avoided. However, in order to secure a long term orbit stability, it is appropriate to choose the distance to at least several millions of km, e.g. at least 2 to 5 million kilometers, or to the minimum short distance secured in terms of the data transmission speed. In this case, the infinite distance velocity is substantially zero or 1 to 2 km/s, low speed, when leaving the earth gravity sphere, and, at the time of a final settling into the synchronous orbit, the orbit correction of approximately several hundred m/s is required, although the correction velocity varies according to the orbital altitude selected. It is appropriate to launch the satellite in autumn equinox or spring equinox so that the sun-synchronous conditions can be met approximately one year after the launch. The launch season can be set arbitrarily according to the conditions of the target orbit. Even during the settling period until the synchronous conditions are reached, the satellite flies in interplanetary space which is substantially far from the earth, thus the scientific observation intended can be started early or continued as the SIRTF satellite did. It should be noted that in the case where the requested observation period is short or where the geometrical conditions of the sun and the earth can be alleviated, the method described here can be appropriately relaxed in which the synchronous conditions are satisfied approximately and the satellite can drift without accomplishing the exact insertion, thus in such a case a significant fuel reduction for orbit maintenance/adjustment can be achieved.

The ultrahigh altitude sun-synchronous orbit satellites of the present invention, which are allocated in the above-described orbit, can be used for providing various services. For example, the following new space observation method can be realized with this ultrahigh altitude sun-synchronous orbit satellite system of the present invention. The ultrahigh altitude sun-synchronous orbit satellites of the present invention can create the condition that a virtual orbit centering around the earth rotates once in one revolution of the earth. On this orbit, the longitudinal direction of the satellite can be aligned to the local vertical direction at all the time, the light and heat radiated from the earth can be avoided. Therefore, by installing an infrared telescope on the satellite rotating around the normal direction of this orbit, the astronomical observation can be performed without suffering from the influence of the light and heat radiated from the earth. Of course, the local solar time at a point on the surface of the earth directly below the satellite, hereinafter referred to as a sub-satellite point on the earth surface, can be kept constant, whereby high quality global earth surface observation can be performed. Since this satellite passes through a polar region of the earth, meteorological observation of the Arctic can be realized and the data thereof can be provided, although such observation cannot be performed by, for example, a conventional meteorological satellite.

Particularly, in the satellites of the present invention, in an orbit with large i/e, the vector perpendicular to the virtual orbital plane of this orbit is always directed in the direction substantially opposite to the sun direction, and the ecliptic plane is substantially scanned during a single revolution for an inertial system. The angle swept by the direction perpendicular to the orbital plane and the sun direction can be selected dependent on the selected i/e, and a suitable parameters are selected for the intended target space observation.

Moreover, the system of the present invention can realize a new satellite communication system as follows. Since this ultrahigh altitude sun-synchronous orbit satellite can fly quite a distance from the earth, the satellite can cover the substantially even a hemisphere of the earth at a time simultaneously. Therefore, this satellite can be used as a communication satellite, and, particularly, with three satellites appropriately allocated on the same virtual orbit with equal intervals, a communication system which covers substantially the entire region of the earth can be realized. Especially, the orbit of the present invention maintains the sun-synchronous conditions and thus the visibility of each satellite is fixed rigorously for the seasons and for the local solar time of the user, hence the user can easily capture the appropriate satellite by referring to a pre-specified antenna pointing operation. Accordingly, a communication system independent of a geostationary satellite can be constructed easily.

Figure 5:
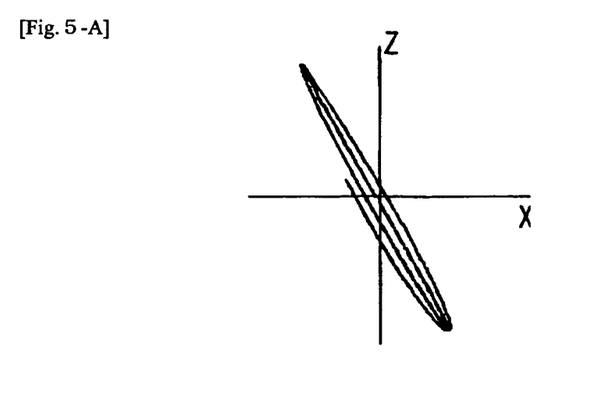

The characteristics of the ultrahigh altitude sun-synchronous orbit satellite shown in FIG. 1 to FIG. 4 basically ignore the attraction of the earth gravity and are based on the characteristics of a two-body motion between the sun and the satellite, thus in this orbit the geometrical relation between the sun and the earth is frozen so as to satisfy the exact sun-synchronous conditions, the ratio of i/e=1.73 is established, and along the trajectory, the distance from the earth is kept substantially constant. FIG. 5 shows the vigorous and accurate numerical simulation result example associated with a certain ideal ultrahigh altitude sun-synchronous orbit which is supposed to keep the distance to the satellite as constant as $1 \times 10^7$ km. In this case, numerical evaluation was performed accurately by setting the i/e ratio to approximately 1.73 and introducing the attraction of the earth gravity and at the same time the attraction of the entire celestial objects in the solar system. As a result, the orbit repeats revolution so as to follow the same trajectory and the distance from the earth is kept substantially constant as shown in the figure, thus the stability of the ultrahigh altitude sun-synchronous orbits of the present invention was confirmed. In order to maintain this orbit, it is required to increase the orbital velocity of 100 to 200 m/s in one year. In FIG. 5, the x-axis is the direction of the earth from the sun, the y-axis is the direction of the earth revolution, and the z-axis is the axis defining a right-hand system with these axes. The center is the earth. In the figure, subtense of each axis forms $1 \times 10^7$ km.

The ultrahigh altitude sun-synchronous orbit satellites of the present invention can maintain the characteristics of the sun-synchronous orbit, not only in the above embodiment based on the two-body motion between the sun and the satellite, but also in the case where the value of the i/e ratio is not necessarily the special value of 1.73, thus the ultrahigh altitude sun-synchronous orbit satellites of the present invention are useful. Moreover an approximate sun-synchronous orbit can be found without even satisfying the exact sun-synchronous orbit conditions, and the characteristics of the ultrahigh altitude sun-synchronous orbit can be maintained with less orbit correction velocity amount although the synchronous characteristics show oscillatory behavior. In this case, as described above, by using the characteristics of the three-body motion where the attraction of the earth may change the orbit by means of the perturbation effect, the insertion into the orbit with a wide range of i/e ratio or into an approximate synchronous orbit can be realized by only using a small orbit correction velocity in a short period of settling transition time. Specifically, according to the ultrahigh altitude sun-synchronous orbit satellites of the present embodiment, the characteristics of the solution of the orbital motion in the three-body motion are utilized, and when the satellites are inserted into the orbit by a rocket or the like choosing appropriate initial conditions defined using the solutions (mainly, flight-path azimuth and the time when the satellites settle into the orbit), the satellite can reach the orbit without carrying out special maneuver operations.

In an ideal case in which the influence of the earth gravity (perturbation) is not considered, the direction in which the satellite leaves the earth is on the line between the sun and the earth. However, in order to realize the orbit insertion plan for making the satellite returning to the vicinity of the earth taking the advantage of the perturbation, it is necessary to shift this leaving direction appropriately aligned slightly to the direction of the earth revolution. The orbit insertion method using perturbation as described above uses this technical means, and a specific example thereof is shown in FIG. 6 and FIG. 7.

FIGS. 6A to 6C specifically illustrate a sequence from launch of the satellite to insertion of the satellite, wherein the perturbation of the attraction of the earth gravity is utilized to insert the satellite into the ultrahigh altitude sun-synchronous orbit in which the i/e ratio is approximately 1. In this case, the increased amount of correction required until the insertion is approximately 500 m/s.

FIGS. 7A to 7C show an example of the orbit in which, similarly, utilization and operation of the attraction of the earth gravity is demonstrated from the launch of the satellite to the insertion of the satellite and in which i=~0 degree. With this condition, the increased amount of correction required until the insertion is only approximately 140 m/s, thus the practicability is extremely high.

Figure 6:
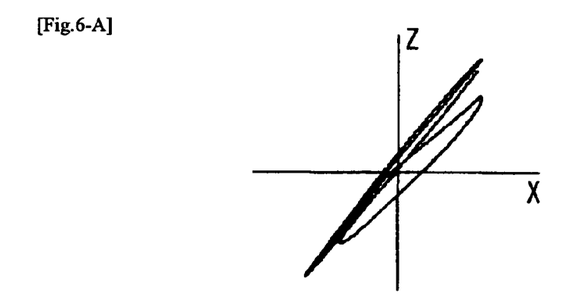
Figure 7:
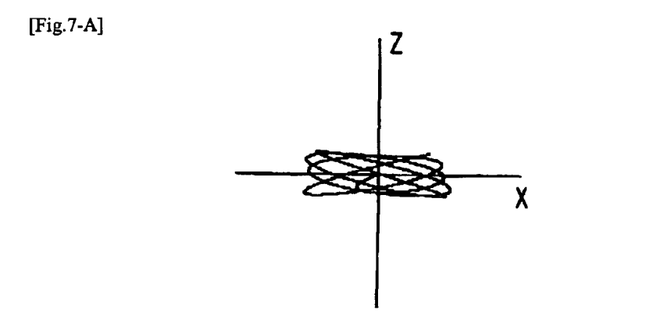

In FIGS. 6 and 7, as with FIG. 5, the x-axis is the direction of the earth from the sun at all times, the y-axis is the direction of the earth revolution, and the z-axis is an axis defining a right-hand system with these axes. The center is the earth. In FIGS. 6A to 6C, subtense of each axis forms $1 \times 10^7$ km, while in FIGS. 7A to 7C, it is $5 \times 10^6$ km. Each figure of the orbit shows a result obtained by reflecting all mass and orbital elements of the major celestial objects in the solar system including the moon, and subjecting thus obtained values to numerical integration.

INDUSTRIAL APPLICABILITY

As described above, the ultrahigh altitude sun-synchronous orbit satellite system of the present invention flies while keeping an ultrahigh altitude sun-synchronous condition of at least several millions of kilometers and can secure a significant distance to the earth which is not affected by the thermal radiation of the earth. Further, since the distance is kept constant or is not increased, the same geometrical conditions of the sun and the earth can be maintained, and an orbit maintenance operation is not basically required once the satellite is inserted into the orbit, thus the ultrahigh altitude sun-synchronous orbit satellite system of the present invention can be applied to various industrial fields including a new space observation system, a new communication system independent of a geostationary satellite, and the like.

The invention claimed is:

1. An ultrahigh altitude sun-synchronous orbit satellite system, comprising:
   one or plural satellites orbiting the sun such that the one or plural satellites revolve around the earth in a substantially circular or elliptic motion at an altitude of several million kilometers from the earth,
   said altitude of several million kilometers being beyond the sphere of earth gravity influence,
   said one or plural satellites being placed on an orbital plane relative to both the sun and the earth and keeping the distance and geometry between the one or plural satellites and the sun and between the one or plural satellites and the earth substantially constant,
   the satellite system performing any one of the services of space observation, global observation, and satellite communication,
   wherein the one or plural satellites orbit the sun with both inclination and eccentricity distinct from those of the earth revolution and revolve around the earth with a sun synchronous property in which the local solar time is kept constant at a point on the surface of the earth directly beneath the satellite.

2. The ultrahigh altitude sun-synchronous orbit satellite system according to claim 1,
   wherein each of the one or plural satellites is a sun-synchronous orbit satellite having a rotation period of approximately one year.

3. The ultrahigh altitude sun-synchronous orbit satellite system according to claim 1 or 2,
   wherein each of the one or plural satellites is a sun-synchronous orbit satellite which makes an orbital revolution motion around the sun governed by the sun's gravity, but revolves around the earth at a distance of at least several millions of kilometers keeping clear of the gravitational influence zone of the earth.

4. The ultrahigh altitude sun-synchronous orbit satellite system according to claim 1 or 2,
   wherein a vector, which is perpendicular to the orbital plane of each of the one or plural satellites, is substantially fixed relative to revolution around the sun, and substantially the entire celestial sphere is scanned and swept during a single revolution about the sun, while avoiding the effects of light and heat from the earth, whereby the space observation is performed.

5. The ultrahigh altitude sun-synchronous orbit satellite system according to claim 1 or 2,
   wherein the local solar time at a sub-satellite point on the surface of the earth is constantly maintained as the same local solar time when each of the one or plural satellites flies over said sub-satellite point, said sub-satellite point being a point on the surface of the earth directly below the satellite where a line connecting the satellite and the center of the earth intersects the surface of the earth.

6. The ultrahigh altitude sun-synchronous orbit satellite system according to claim 1 or 2,
   wherein in the satellite communication, substantially a hemisphere of the earth coverage can be realized at a time simultaneously with one of the one or plural satellites, and substantially the entire region of the earth coverage can be achieved by disposing a small number or three of the one or plural satellites in the said satellite system at equal intervals.

7. The ultrahigh altitude sun-synchronous orbit satellite system according to claim 1 or 2,
   wherein by using perturbation of the attraction of the earth gravity in each of the one or plural satellites, the geometrical relation in terms of a direction and a distance among sun, earth, and the one or plural satellites, in the said satellite system, is kept constant season to season during the revolution about the sun in such a way that said one or plural satellites in said ultrahigh altitude sun-synchronous orbit passes over the meridian line of any given point on the surface of the earth at the same local solar time while substantially maintaining the geometrical relation for a wide range of ratio between an orbit inclination angle and eccentricity.

8. The ultrahigh altitude sun-synchronous orbit satellite system according to claim 1 or 2,
   Wherein the ratio between the orbit inclination angle and eccentricity in each of the one or plural satellites is set to 1.73, and a geometrical relation in terms of a direction and a distance among sun, earth, and the one or plural satellites, in the said satellite system, is kept constant season to season during the revolution about the sun in such a way that said one or plural satellites in said ultrahigh altitude sun-synchronous orbit passes over the meridian line of any given point on the surface of the earth at the same local solar time while substantially maintaining the constant distance from the earth to the said one or plural satellites.

9. The ultrahigh altitude sun-synchronous orbit satellite system according to claim 1,
   wherein each of the one or plural satellites is placed into orbit by means of a sequence using the perturbation of the attraction of the earth gravity, significantly reducing an orbit correction velocity amount.

* * * * *